US009190939B2

(12) United States Patent
Modolo

(10) Patent No.: US 9,190,939 B2
(45) Date of Patent: *Nov. 17, 2015

(54) DEVICE AND METHOD FOR MANAGING THE ELECTRIC BRAKING OF A VEHICLE

(75) Inventor: Ivan Modolo, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/116,166

(22) PCT Filed: May 9, 2012

(86) PCT No.: PCT/EP2012/058568

§ 371 (c)(1), (2), (4) Date: Dec. 3, 2013

(87) PCT Pub. No.: WO2012/156252

PCT Pub. Date: Nov. 22, 2012

(65) Prior Publication Data

US 2014/0084820 A1 Mar. 27, 2014

(30) Foreign Application Priority Data

May 13, 2011 (FR) ..................................... 11 54187

(51) Int. Cl.

| | |
|---|---|
| ***H02P 3/14*** | (2006.01) |
| ***H02P 3/18*** | (2006.01) |
| ***B60L 7/22*** | (2006.01) |

(Continued)

(52) U.S. Cl.

CPC ... *H02P 3/14* (2013.01); *B60L 7/14* (2013.01); *B60L 7/22* (2013.01); *B60L 11/1803* (2013.01); *B60L 11/1866* (2013.01); *B60L 2240/545* (2013.01); *B60L 2240/547* (2013.01);

(Continued)

(58) Field of Classification Search

USPC .......................................... 318/362, 375, 376

See application file for complete search history.

(56) References Cited

U.S. PATENT DOCUMENTS

| | | | | |
|---|---|---|---|---|
| 4,093,900 | A | 6/1978 | Plunkett | 318/370 |
| 5,291,106 | A | 3/1994 | Murty et al. | 318/375 |

(Continued)

FOREIGN PATENT DOCUMENTS

| | | |
|---|---|---|
| DE | 43 31 721 A1 | 3/1994 |
| DE | 196 19 190 C1 | 1/1998 |

(Continued)

*Primary Examiner* — Kawing Chan

(74) *Attorney, Agent, or Firm* — Fitzpatrick, Cella, Harper & Scinto

(57) ABSTRACT

A device for managing electric braking power includes a continuous bus, a dissipation branch, a current sensor, a controller, and an electronic charging switch. The bus includes a first pole for connection to a vehicle electric traction machine, a second pole for connection to a battery, and a connection point for connection to the dissipation branch, which includes an electronic dissipation switch connected to a dissipation resistor. The current sensor and the charging switch are positioned on the bus between the connection point and the second pole. The charging switch controls a flow of current over the bus from the first pole to the second pole. When power sent over the bus is greater than a total of power that charging of the battery can absorb and power that the dissipation resistor can dissipate, the controller causes the charging switch to open.

5 Claims, 1 Drawing Sheet

(51) Int. Cl.
*B60L 7/14* (2006.01)
*B60L 11/18* (2006.01)

(52) U.S. Cl.
CPC ........ *B60L2240/549* (2013.01); *Y02T 10/7005* (2013.01); *Y02T 10/7061* (2013.01)

(56) References Cited

U.S. PATENT DOCUMENTS

| | | | | |
|---|---|---|---|---|
| 5,457,375 | A | 10/1995 | Marcinkiewicz et al. | 318/802 |
| 5,466,998 | A | 11/1995 | Kinoshita et al. | 318/385 |
| 5,557,181 | A | 9/1996 | Naito et al. | 318/376 |
| 5,600,125 | A | 2/1997 | Poorman et al. | 250/205 |
| 6,414,455 | B1 | 7/2002 | Watson | 318/432 |
| 6,737,822 | B2 * | 5/2004 | King | 318/375 |
| 7,057,361 | B2 | 6/2006 | Kitahata et al. | 318/139 |
| 7,923,951 | B2 * | 4/2011 | Soma et al. | 318/376 |
| 8,449,049 | B2 | 5/2013 | Bourqui et al. | 303/151 |
| 2003/0088343 | A1 | 5/2003 | Ochiai et al. | 701/22 |
| 2004/0074681 | A1 | 4/2004 | Ono et al. | 180/65.1 |
| 2005/0007049 | A1 | 1/2005 | Kim | 318/376 |
| 2006/0061307 | A1 * | 3/2006 | Donnelly | 318/108 |
| 2007/0164693 | A1 | 7/2007 | King et al. | 318/109 |
| 2008/0148993 | A1 * | 6/2008 | Mack | 105/35 |
| 2008/0289226 | A1 * | 11/2008 | Yamagishi et al. | 37/246 |
| 2014/0077732 | A1 * | 3/2014 | Modolo | 318/376 |

FOREIGN PATENT DOCUMENTS

| | | | |
|---|---|---|---|
| EP | 1 410 942 | A2 | 4/2004 |
| EP | 1 591 300 | A1 | 11/2005 |
| EP | 1 672 764 | A2 | 6/2006 |
| JP | 2007-306754 | A | 11/2007 |
| JP | 2009-261242 | A | 11/2009 |
| JP | 2010-233304 | A | 10/2010 |
| WO | WO 2008/000636 | A1 | 1/2008 |

* cited by examiner

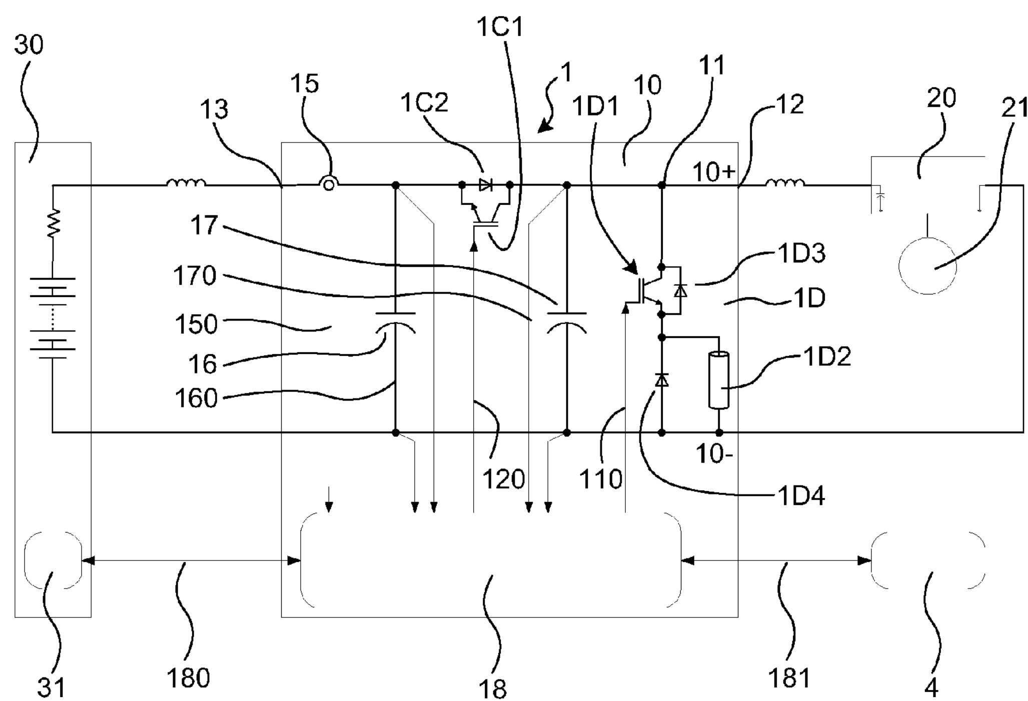
30
13
15
1C2
1C1
1
1D1
10
11
12
20
21
10+
17
170
150
16
160
1D3
1D
1D2
120
110
10-
1D4
31
180
18
181
4

DEVICE AND METHOD FOR MANAGING THE ELECTRIC BRAKING OF A VEHICLE

FIELD OF THE INVENTION

The present invention relates to road vehicles. It relates in particular to the braking systems of a road vehicle with electric traction. More particularly, it relates to the management of the electric braking power.

DESCRIPTION OF THE PRIOR ART

Electric vehicles encompass vehicles in which the electric energy necessary to move them is stored in batteries and vehicles in which the electric energy is produced onboard at least in part, for example by a heat engine driving a generator or by a fuel cell. In electric vehicles, even though the braking of the vehicle is provided by a conventional friction mechanical braking system, it is known that one of the values of electric vehicles comes from their ability to regenerate, in the form of electricity, and store a portion of the energy generated during braking.

Specifically, since an electric machine is reversible, it can be used as a motor and also as an electric generator during the braking phases of the vehicle and in this case it transforms the mechanical braking energy into electric energy that the vehicle must absorb, preferably by storing it in order to save the energy necessary for the use of a vehicle, and inevitably by dissipating it when it is not or no longer possible to store it. This operating mode is often called "electric braking" or "regenerative braking" even when, in fact, the electric energy obtained by causing the electric machine(s) to operate is finally thermally dissipated at least partially.

As an illustration of the prior art, it is possible to cite Patent Application US 2003/0088343 which describes an electric traction chain for a hybrid motor vehicle fitted with an internal combustion engine and an electric machine which intervenes as an assistance for the driving of the vehicle. The electric machine is itself powered by a battery. More particularly, for the electric braking aspect, it is possible to cite Patent Application WO 2008/000636 which describes an electric braking mode, notably which evokes an electric energy management strategy programmed in an electronic regeneration module, the latter distributing the braking energy so as to recharge a bank of super capacitors and/or so as to dissipate the energy in an electric dissipation resistor. This document adds that the power of the means for storing the electric energy, in this instance super capacitors, can be limited, and that beyond the level of braking that this power allows, the electric power produced by the electric traction machine must then be directed to the dissipation means. This document, which concentrates on the organisation of a redundancy in order to reach a high degree of reliability of a purely electric braking, does not give details on the management of recharging the means for storing the electric energy.

The objective of the present invention is to propose the means for providing powerful electric braking, by dissipation of the electric energy produced by an electric machine operating in generator mode, which is optimal and independent of the state of charge of the means for storing electric energy, while offering also and preferably the means for providing an optimal recharging of a means for storing electric energy.

BRIEF DESCRIPTION OF THE INVENTION

The invention proposes a device for managing electric braking power comprising a continuous bus, the said continuous bus comprising:

- a pole for connection to an electric traction machine of a vehicle, the machine being associated with an inverter, the inverter delivering, in braking mode, over the continuous bus, an electric braking power,
- a pole for connection to a battery for storing electric energy, the device comprising:

- a dissipation branch connected at a connection point to the continuous bus, the said branch comprising a dissipation resistor,
- between the connection point of the dissipation branch to the continuous bus and the pole for connection to a battery of the continuous bus, an electronic charging switch,
- a current sensor on the continuous bus, placed between the connection point of the continuous bus and the pole for connection to a battery,
- a controller receiving:
  - a measurement of the voltage "U" on the continuous bus,
  - an item of information on "battery recharge current limit",
  - a measurement of the current on the continuous bus delivered by the current sensor on the continuous bus,
- the controller calculating the power that the charging of the battery can absorb on the basis of the voltage "U" on the continuous bus and the item of information on "battery recharge current limit", the controller calculating the power that the dissipation resistor can dissipate on the basis of the value of the said dissipation resistor and of the voltage "U" on the continuous bus, the controller calculating the power sent over the continuous bus on the basis of the value of the measurement of the current on the continuous bus delivered by the current sensor and of the voltage "U" on the continuous bus and, when the power sent over the continuous bus is greater than the total of the powers that the charging of the battery and the dissipation in the dissipation resistor can absorb, the controller opens the electronic charging switch.

The invention also extends to a method for managing the electric braking mode of a vehicle comprising an electric traction machine of the said vehicle, comprising an electric circuit connecting the said electric machine to a battery for storage of electric energy and to a resistor for dissipation of electric energy, in which, when the electric braking power is greater than the total of the battery recharging power and the dissipation power in the electric energy dissipation resistor, the battery is disconnected so as to allow a rise in the voltage of the electric circuit connecting the said electric machine to the dissipation resistor.

BRIEF DESCRIPTION OF THE FIGURE

The rest of the description makes it possible to clearly understand all the aspects of the invention by means of FIG. 1 which illustrates a device according to the invention.

DESCRIPTION OF BEST EMBODIMENTS OF THE INVENTION

FIG. 1 shows a device for managing electric braking power 1 connected on the one hand to an inverter 20 supplying an electric traction machine 21 of a vehicle and on the other hand to a battery 30 for storing electric energy. An overall central management unit of the vehicle 4 provides the general supervision of the vehicle and communicates with the device for managing the electric braking power 1 as will be explained below. The battery 30 comprises a battery management system 31. The device for managing electric braking power 1 comprises a continuous bus 10 of which the positive line 10+ and the negative line 10− can be seen. The device for managing the electric braking power 1 comprises a first pole 12 for connection to the inverter 20, and a second pole 13 for connection to the battery 30. The device for managing electric braking power 1 comprises a dissipation branch 1D connected at a connection point 11 of the dissipation branch 1D to the continuous bus 10, in parallel with the inverter 20 supplying the electric traction machine 21. This dissipation branch 1D comprising an electronic dissipation switch 1D1, consisting of a transistor of the IGBT (Insulated Gate Bipolar Transistor) type, connected in series to a dissipation resistor 1D2. Also seen is a diode 1D3 associated by construction of a transistor of the IGBT type, and a diode 1D4 which, when the electronic dissipation switch 1D1 is opened, allows the current that flowed in the dissipation resistor 1D2 to be cancelled out. This is particularly useful since the circuit is inductive. Note that the electronic dissipation switch 1D1 could be another type of semiconductor, for example a transistor of the MOS (Metal Oxyde Semiconductor) type, the choice being made by those skilled in the art depending on the practical details of construction.

The device for managing electric braking power 1 comprises an electronic charging switch 1C1 placed between the connection point 11 of the dissipation branch 1D to the continuous bus 10 and the second pole 13 for connection to a battery of the continuous bus. The said electronic charging switch is advantageously a transistor, as indicated above for the electronic dissipation switch 1D1. The electronic charging switch 1C1 controls the flow of current over the continuous bus 10 from the first connection pole 12 to the second pole 13 for connection to a battery. "Controlling the flow of current" means that the current is regulated as will be explained below.

The device for managing electric braking power 1 comprises a current sensor 15 on the continuous bus 10 placed between the electronic charging switch 1C1 and the second connection pole 13. In practice, preferably, the current sensor 15 must be as close as possible to the battery 30 because there are (or may be) other consuming elements connected to the continuous bus 10, upstream of the electronic charging switch 1C1, and the current sensor 15 monitors the battery current both when charging and when discharging.

The device for managing electric braking power 1 also comprises, mounted in parallel with the electronic charging switch 1C1, a diode 1C2 allowing the flow of current over the continuous bus 10 from the second connection pole 13 to the first connection pole 12. Capacitors 16 and 17 are connected to the continuous bus 10 on either side of the electronic charging switch 1C1 in order to smooth the voltage over the continuous bus 10 when the electronic charging switch 1C1 and respectively the electronic dissipation switch 1D1 is closed or opened.

A controller 18 drives the device for managing the electric braking power 1. It can be seen that it receives from the battery-management system 31, via a CAN® bus 180, various items of information useful for the management of the braking power, of which a setpoint of "battery recharge current limit" Ic_recharge_max, a measurement of the current over the continuous bus 10 delivered by the current sensor 15, via a line 150, a measurement of the voltage "U" over the continuous bus 10, between the electronic charging switch 1C1 and the second connection pole 13, via a line 160, a measurement of the voltage over the continuous bus 10, between the electronic charging switch 1C1 and the first connection pole 12, via a line 170, and various items of information coming from the overall central management unit of the vehicle 4 via a CAN® bus 181. The braking torque is managed by the overall central management unit of the vehicle 4 which, depending on the desire of the driver of the vehicle, sends via the CAN® bus 180 to the inverter 20 a torque setpoint. The inverter 20, up to the limit of the maximum admissible current (this maximum admissible current is determined by the controller 18) over the continuous bus 10, controls the electric machine 21 so as to develop this torque. Finally, the controller 18 drives the electronic dissipation switch 1D1 and the electronic charging switch 1C1 by sending the appropriate electric signals over the dissipation control line 110 and over the charging control line 120, respectively. In this manner, the controller 18 manages the flow of power which runs up the drive chain and directs it to the correct location.

Let us now move on to the operation of the electric braking power management device 1.

Let us begin with the hypothesis in which the power sent over the continuous bus 10 is greater than the total of the powers that the charging of the battery 30 and the dissipation in the dissipation resistor 1D2 can absorb when 1C1 is closed. In this case, or when the charging of the battery 30 is total, the electric braking power management device 1 operates in "maximum dissipation mode", an operation during which the electronic charging switch 1C1 is permanently open and the electronic dissipation switch 1D1 is permanently closed (a duty cycle of 100%). There is no electric energy regeneration by charging of the battery 30. The voltage "U" of the continuous bus 10 will increase and be stabilised so as to balance the dissipation power in the dissipation resistor 1D2 with that produced by the electric traction machine or machines 21 sending electric energy over the continuous bus 10. If the power produced by the electric traction machine or machines 21 increases, the voltage of the bus increases and vice versa.

Let us now consider another hypothesis in which the power produced by the electric traction machine or machines 21 reduces sufficiently, to the point of being below the power that can be absorbed by the battery 30 and the dissipation resistor 1D2. In this case, the electric braking power management device 1 operates in maximum charging mode. The electronic charging switch 1C1 is closed and the slaving operated by the controller 18 regulates the duty cycle of the electronic dissipation switch 1D1 so as to slave the charging current to the maximum of what is allowed by the battery management system 31.

The optimum recharging of an electrochemical battery, depending on the technology of the latter, may be carried out by a constant current, within the limit of a value Ic_recharge_max. For example, lithium polymer batteries or lithium ion batteries accept charging currents that are quite considerable but still less than the discharging currents. The determination of setpoint values for Ic_recharge_max (that is to say the setpoint of a battery recharge current limit) depends on the electric accumulator technology used, possibly other parameters such as temperature, state of charge, vehicle conditions, all things that are outside the context of the present invention. The said battery recharge current limit is a parameter which the present invention exploits cleverly.

Preferably, the controller 18 comprises a comparator evaluating the difference between the battery recharge current limit and the current over the continuous bus, the controller comprising a unit driving the electronic dissipation switch so as to leave the said electronic charging switch closed so long as the current over the continuous bus is less than the battery recharge current limit and so as to drive the said electronic dissipation switch according to a cycle keeping the battery charging current equal to the battery recharge current limit when the current over the continuous bus is less than the battery recharge current limit.

Thus, the driving of the dissipation power, that is to say the portion of the power produced by the electric machine 21 that cannot be used to charge the battery 30, is carried out by an appropriate duty cycle of opening and closing of the electronic dissipation switch 1D1; the time during which the electronic dissipation switch 1D1 is open varies depending on the difference between the maximum battery charging current setpoint and the measurement of the current by the current sensor 15. By convention, "maximum charging mode" is the name for an operation of the electric braking power management device 1 during which the electronic charging switch IC1 is permanently closed.

In maximum charging mode, the power sent over the continuous bus 10 (by the inverter(s) 20 of the driving machines 21) is necessarily lower than the power that the battery 30 and the dissipation resistor 1D2 can absorb when 1D1 is closed. In this operating mode, the voltage applied to the terminals of the dissipation resistor 1D2 is equal to that of the battery (ignoring the voltage drops in the semiconductors and in the electric lines). The slaving controls the duty cycle of the electronic dissipation switch 1D1 so that the battery charging current 30 is at the maximum of what the said battery allows. The more the power produced by the driving machine(s) 21 increases, or the more the charging power of the battery 30 reduces, the more the duty cycle of the electronic dissipation switch 1D1 increases so as to reduce the power directed towards the battery.

When a predefined voltage value characteristic of a maximum charge is reached, there is a transition to a final phase of charging by keeping the voltage of the battery 30 constant. In this phase, the charging current is monitored, the latter reducing gradually. When this current falls below a given value (for example, Ic_recharge_max/20), the battery is considered fully charged.

At the battery 30 itself, the management of its charge is controlled by the battery management system 31. It is this battery management system 31 which, depending on the voltage of the battery, its temperature, etc., determines the said maximum recharge current Ic_recharge_max. This maximum recharge current Ic_recharge_max is the setpoint sent over the CAN® bus 180. The braking power management device 1 operates so as not to exceed this current. Specifically, in a first phase in which the predefined voltage of the battery is not reached, the battery management system 31 gives, over the CAN® bus 180 as Ic_recharge_max the limit given by the battery manufacturer. In a second phase, when the predefined voltage of the battery is reached, the battery management system 31 calculates and sends over the CAN® bus 180 a recharge current Ic_recharge which makes it possible to reach this predefined voltage. Gradually as the battery 30 is charged, this current Ic_recharge reduces.

Preferably, a maximum of energy needs to be stored in the battery 30 then, when this is accomplished, advantageously a maximum of electric braking energy is dissipated in the dissipation resistor 1D2 in order to minimize (or remove condition of wear) the recourse to a mechanical braking by friction, thus reducing the wear of the brake pads and discs.

In practice, the controller 18 contains the means for calculating in real time the maximum possible dissipation power and the real dissipation power, and the maximum possible charging power and the real charging power for the purpose of optimal control. There is a transition from the maximum recharging mode to the maximum dissipation mode when the electronic dissipation switch 1D1 is permanently closed. The controller 18 adjusts the dissipation so as to recharge the battery to the maximum of what is technologically possible in the circumstances that exist at the time.

In conclusion, it has been seen above that, according to the invention, a method is proposed in which, when the electric braking power is greater than the total of the battery recharging power and the dissipation power in the electric energy dissipation resistor, the battery is disconnected so as to allow a rise in the voltage of the electric circuit connecting the said electric machine to the dissipation resistor. Moreover, preferably, according to the method proposed by the invention, the dissipation current passing through the dissipation resistor is slaved to the difference between the battery charging current and the maximum charging current admissible for the said battery.

The invention claimed is:

1. A device for managing electric braking power, the device comprising:
- a continuous bus that includes:
  - a first pole for connection to an electric traction machine of a vehicle, the machine being associated with an inverter that delivers, in a braking mode over the continuous bus, an electric braking power,
  - a second pole for connection to a battery for storing electric energy, and
  - a connection point;
- a dissipation branch connected to the continuous bus at the connection point, the dissipation branch including a dissipation resistor;
- an electronic charging switch positioned between the connection point and the second pole;
- a current sensor positioned between the connection point and the second pole; and
- a controller, which is structured to receive: a measurement of a voltage U on the continuous bus, limit information on a battery recharge current limit, and a measurement of a current on the continuous bus provided by the current sensor,
- wherein the controller calculates a power that charging of the battery can absorb based on the voltage U on the continuous bus and the limit information,
- wherein the controller calculates a power that the dissipation resistor can dissipate based on a value of the dissipation resistor and the voltage U on the continuous bus,
- wherein the controller calculates a power sent over the continuous bus based on a value of the measurement of the current on the continuous bus provided by the current sensor and the voltage U on the continuous bus, and
- wherein, when the power sent over the continuous bus is greater than a total of the power that the charging of the battery can absorb and the power that the dissipation resistor can dissipate, the controller causes the electronic charging switch to open.

2. The device for managing electric braking power according to claim 1, wherein the dissipation branch includes an electronic dissipation switch connected in series to the dissipation resistor.

3. The device for managing electric braking power according to claim 2, wherein the electronic dissipation switch is a transistor.

4. The device for managing electric braking power according to claim 1, further comprising a diode mounted in parallel with the electronic charging switch, the diode structured to allow a flow of current on the continuous bus from the second pole to the first pole.

5. The device for managing electric braking power according to claim 1, wherein the electronic charging switch is a transistor.

* * * * *